(12) United States Patent
Tan et al.

(10) Patent No.: US 8,406,918 B2
(45) Date of Patent: Mar. 26, 2013

(54) MASTER TEACHING JIG

(75) Inventors: Yi Chun Tan, Penang (MY); Huat Seng Khor, Penang (MY); Eang Keong Tan, Penang (MY); Chun Beng Ang, Penang (MY); Chay Hoon Tang, Penang (MY)

(73) Assignee: WD Media, LLC, San Jose, CA (US)

( * ) Notice: Subject to any disclaimer, the term of this patent is extended or adjusted under 35 U.S.C. 154(b) by 575 days.

(21) Appl. No.: 12/643,929

(22) Filed: Dec. 21, 2009

(65) Prior Publication Data
US 2011/0153061 A1 Jun. 23, 2011

(51) Int. Cl.
| | |
|---|---|
| G06F 7/00 | (2006.01) |
| G06F 17/00 | (2006.01) |
| G05B 21/00 | (2006.01) |
| G01C 17/38 | (2006.01) |
| G01B 5/28 | (2006.01) |
| G01P 11/00 | (2006.01) |

(52) U.S. Cl. ........ 700/218; 700/228; 700/231; 700/222; 700/279; 702/94; 702/35; 702/149

(58) Field of Classification Search .......... None
See application file for complete search history.

(56) References Cited

U.S. PATENT DOCUMENTS

| | | | |
|---|---|---|---|
| 4,457,664 A | 7/1984 | Judell et al. | |
| 4,735,540 A | 4/1988 | Allen et al. | |
| 5,504,345 A | 4/1996 | Bartunek et al. | |
| 5,660,114 A | 8/1997 | Gruber | |
| 5,814,196 A | 9/1998 | Hollars et al. | |
| 6,027,301 A | 2/2000 | Kim et al. | |
| 6,126,380 A | 10/2000 | Hillman | |
| 6,356,091 B1 | 3/2002 | Nimtz et al. | |
| 6,405,101 B1 | 6/2002 | Johanson et al. | |
| 6,629,053 B1 * | 9/2003 | Mooring | 702/94 |
| 6,728,596 B1 | 4/2004 | Lindseth | |
| 7,095,496 B2 | 8/2006 | Sezginer et al. | |
| 7,215,419 B2 | 5/2007 | Sezginer et al. | |

FOREIGN PATENT DOCUMENTS

| | | |
|---|---|---|
| DE | 102006017423 A1 | 10/2007 |
| WO | 2007103896 A2 | 9/2007 |
| WO | WO 2007103896 A2 * | 9/2007 |

OTHER PUBLICATIONS

ANELVA C-3040 Disk Sputtering System Teaching Manual, ANELVA Corporation, Oct. 15, 2004, 102 pages.

* cited by examiner

*Primary Examiner* — Gene Crawford
*Assistant Examiner* — Yolanda Jones

(57) ABSTRACT

A disk carrier for teaching disk positioning in a substrate changing system. The disk carrier composed of a panel having a disk opening configured to receive a disk and a plurality of beam sensors disposed around the disk opening to project beams parallel to a surface of the disk when secured within the disk opening. The plurality of beam sensors may be composed of at least one beam sensor on each of a front side and rear side of the panel.

18 Claims, 8 Drawing Sheets

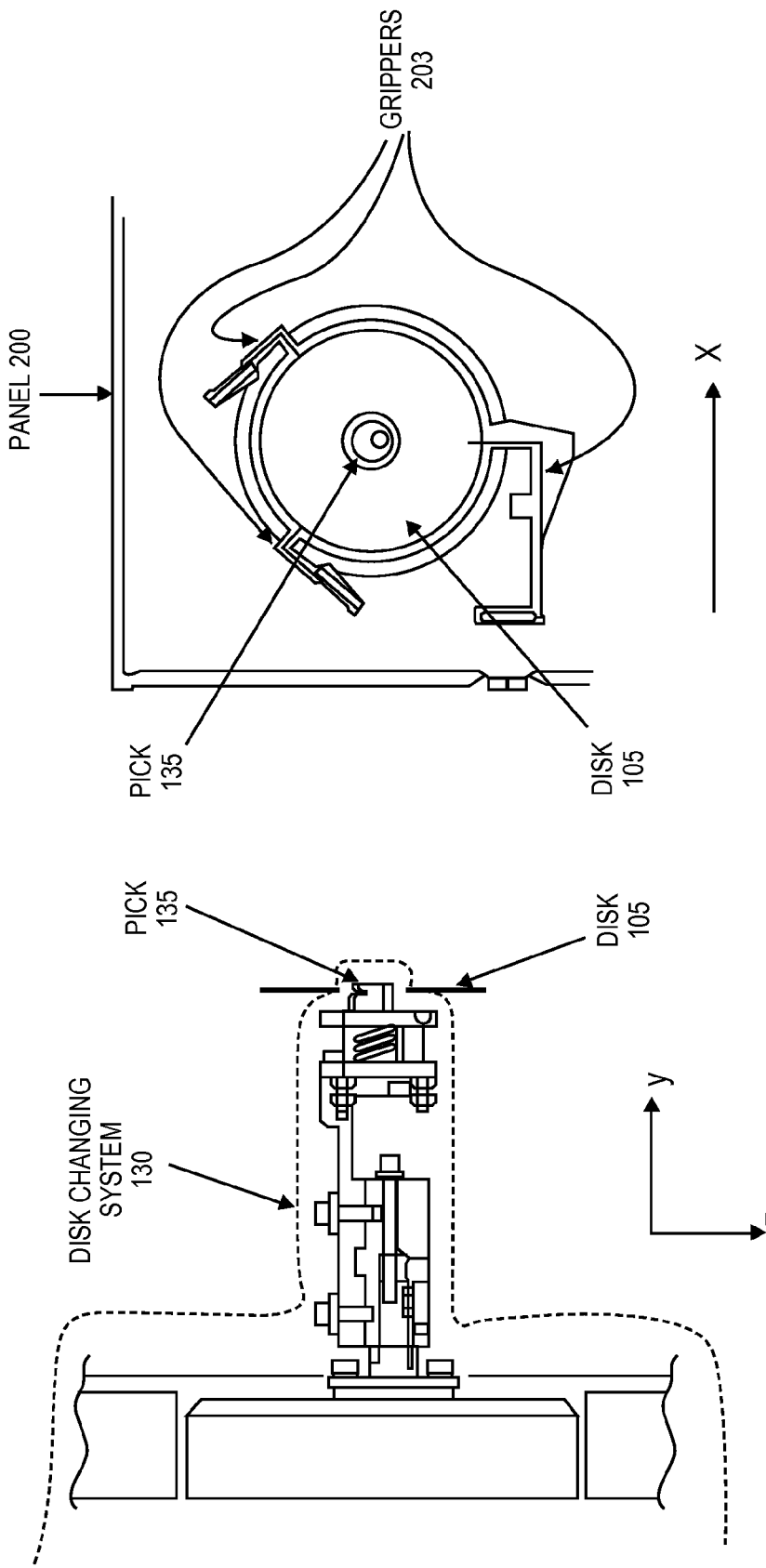

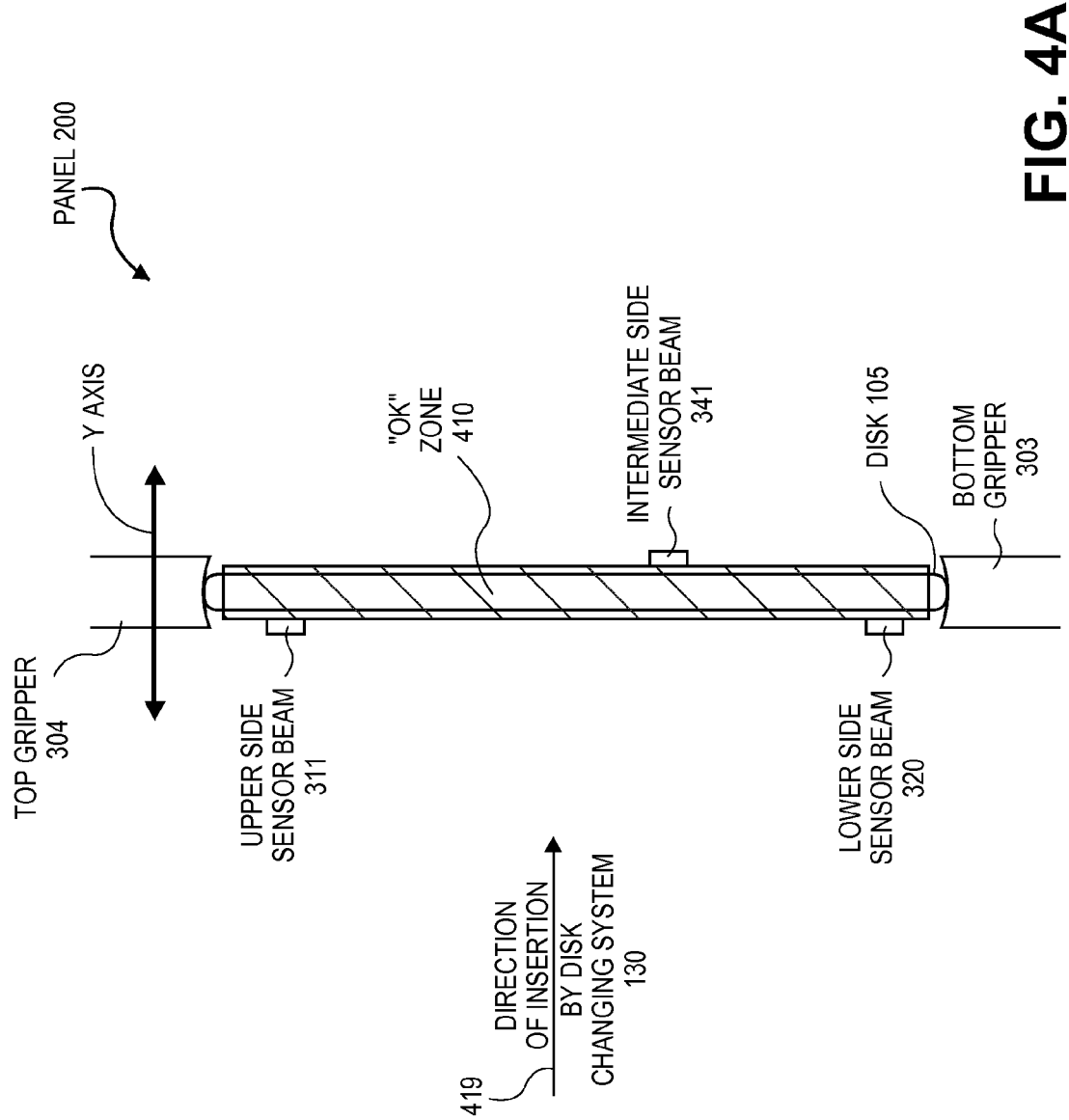

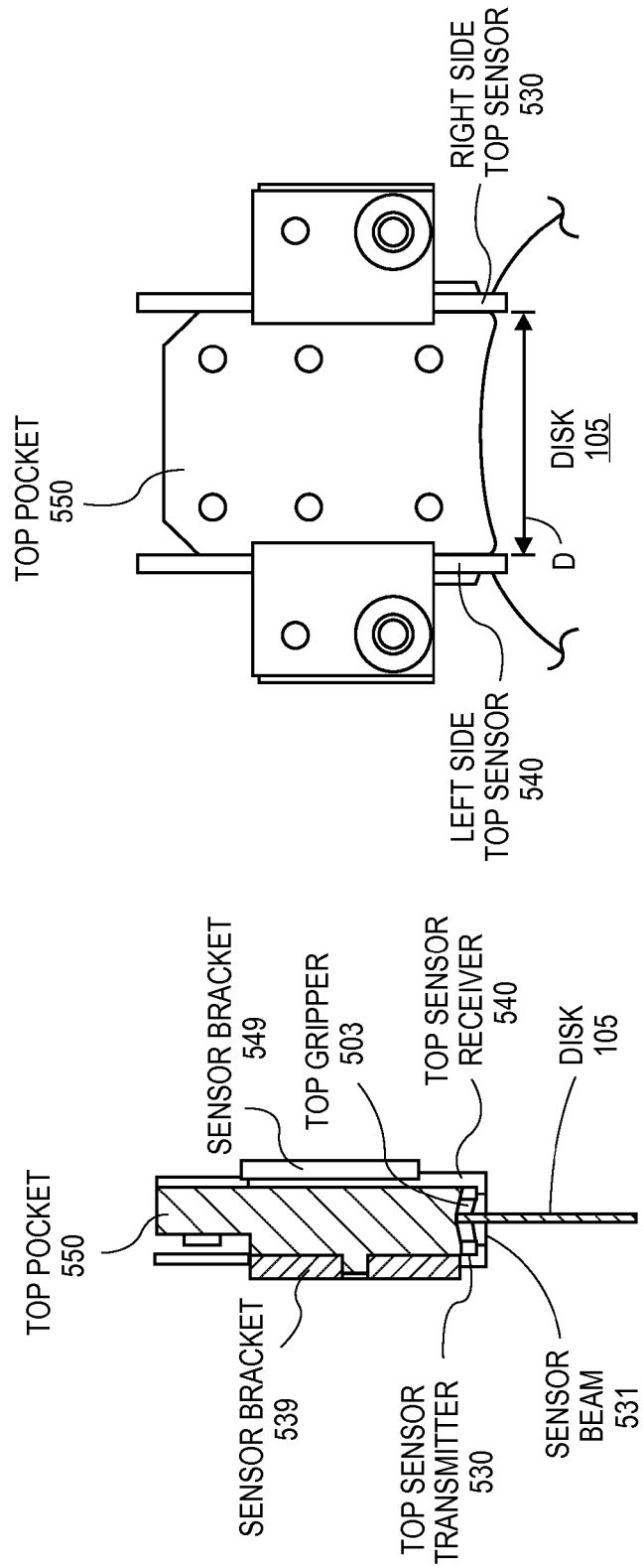

MASTER TEACHING JIG

TECHNICAL FIELD

Embodiments described herein relate to the field of disk processing systems, and, in particularly, to teaching on a substrate changing system.

BACKGROUND

Various processing systems are used in the fabrication of magnetic recording disks. One such processing system is the ANELVA C3040 disk sputtering system, available from the Canon ANELVA Corporation of Japan. The C3040 system includes a pick and place system that uses an x-robot and damper pick to transport a disk from a buffering stage to the carrier panels. With a speed of 1300 pph, a disk that is not situated properly within the carriers may drop out of the carrier grippers during transportation of a disk between chambers.

In addition, the damper pick at the end of the x-robot requires changing during each clean up. After the damper pick is changed, the x-robot's positioning alignment of a disk within a carrier needs to be re-calibrated. It is difficult for a technician to manually perform a precision recalibration using their naked eye and a "gut feel" for when the x-robot has positioned a disk in proper alignment within a carrier.

BRIEF DESCRIPTION OF THE DRAWINGS

The present invention is illustrated by way of example, and not limitation, in the figures of the accompanying drawings in which:

FIG. 2A illustrates a side view of disk changing system according to one embodiment of the present invention.

FIG. 2B illustrates a frontal view of one embodiment of a carrier panel, rotated 90 degrees with respect to the side view of FIG. 2A.

FIG. 4A is a cross sectional view conceptually illustrating the operation of the side beam sensors when a disk is in alignment, according to one embodiment of the present invention.

FIG. 5A is a cross sectional view conceptually illustrating the operation of top beam sensors, according to one embodiment of the present invention.

FIG. 5B is a frontal view conceptually illustrating the operation of top beam sensors, according to one embodiment of the present invention.

DETAILED DESCRIPTION

Embodiments of a method are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known manufacturing processes and equipment have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

Embodiments of a disk sputtering system having a disk carrier positioning apparatus and method of teaching disk positioning are described. In one embodiment, the disk sputtering system comprises a disk transportation carrier comprising a panel having a plurality of disk openings, each of the disk openings have corresponding disk grippers to secure disk therein, and a disk changing system operatively coupled with the disk transportation system to insert disks into and extract disks from the grippers within the disk openings. In one embodiment, the disk carrier positioning apparatus comprises a plurality of beam sensors disposed around each of the disk openings to project beams parallel to a surface of the disk when secured within the disk openings, with each of the plurality of beam sensors comprising at least one beam sensor on each side of the panel. In one embodiment, the method of teaching disk positioning into the disk openings of the panel comprises inserting a disk into a disk opening of a carrier using a robotic arm, and detecting a misalignment of the inserted disk within the carrier using a plurality of beam sensors disposed around the disk opening.

Figure 1:
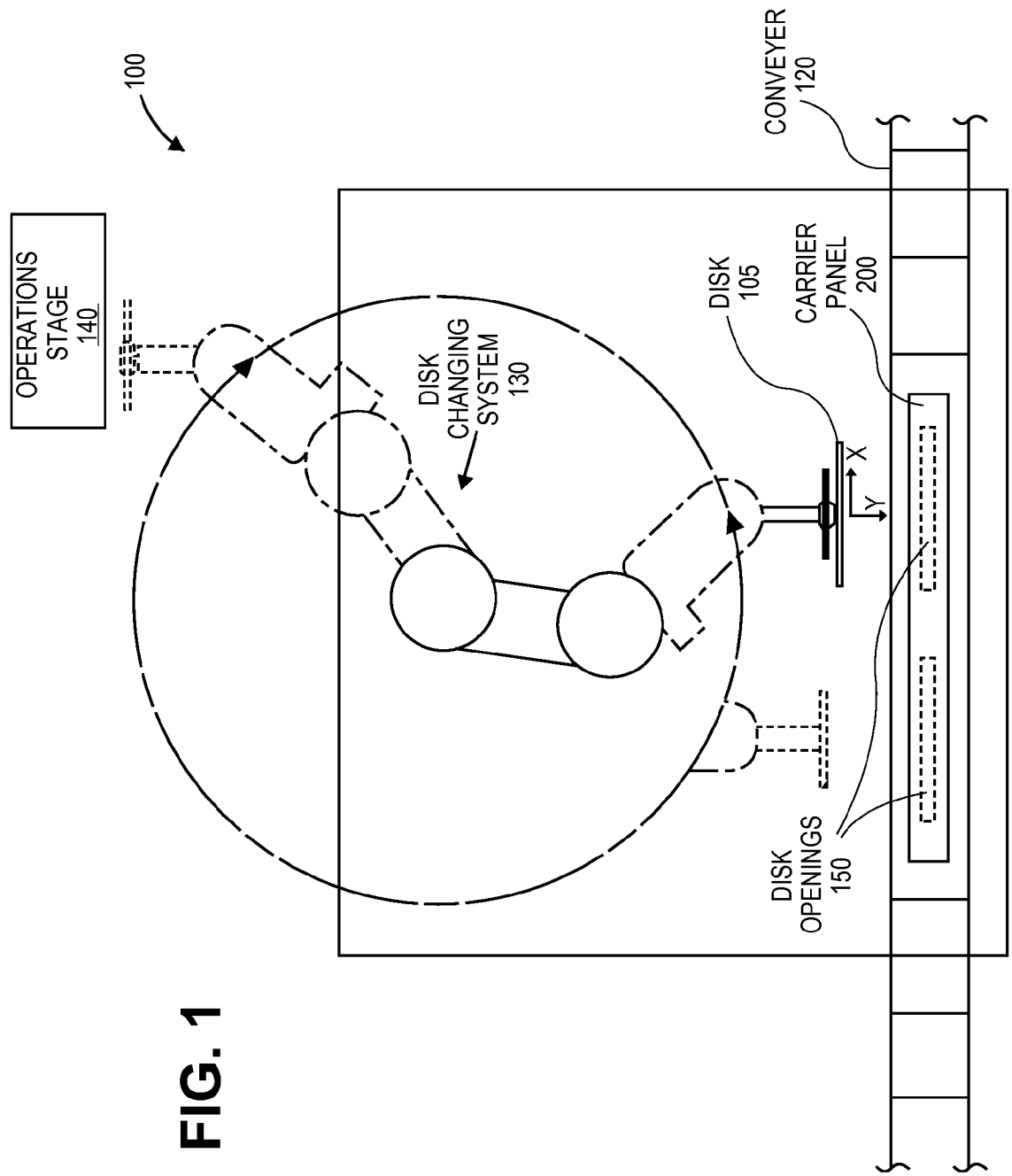
FIG. 1 illustrates components of a disk sputtering system with a disk carrier positioning apparatus according to one embodiment of the present invention.

FIG. 1 illustrates components of a disk sputtering system with a disk carrier positioning apparatus according to embodiments of the present invention. In one embodiment, the disk sputter system 100 is an ANELVA C3040 disk sputtering system, available from the Canon ANELVA Corporation of Japan. In alternative embodiments, the system 100 may other types of sputtering systems or other types of disk processing systems used in the fabrication of disks. In addition, although embodiments of the invention may be discussed herein in relation to magnetic recording disk, the apparatus and methods discussed herein may also be used with other types of disks, for example, optical recording disks such as a compact disc (CD) and a digital-versatile-disk (DVD).

The illustrated components of the disk sputtering system 100 include a carrier panel 200 disposed on a conveyor 120 used to transport the carrier panel 200 to a station position to be operated on by a disk changing system 130 and also to one or more chambers of the disk sputter system for processing of one or more disks retained with disk openings 150 of the carrier panel 200. In one embodiment, the disk changing system 130 is composed of a robotic arm 130 to transport disks between the carrier panel 200 and an operations stage 140 (e.g., heating station, a cooling station or a buffering stage). Alternatively, the disk changing system 130 may utilize other types of pick and place mechanisms. In one embodiment, the carrier panel 200 has a magnetic transport base (e.g., base 210 of FIG. 3A) that enables the carrier panel 200 to be retained on the conveyer 120 using magnetic force. The robotic arm 130 has an end-effector having a pick 135 to secure a disk 105, as further described below in relation to FIGS. 2A and 2B.

FIG. 2A illustrates a side view of disk changing system 130 and FIG. 2B illustrates a frontal view of the panel rotated 90 degrees with respect to the side view of FIG. 2A in order to show the interaction between the pick 135 and the disk 105 when secured within panel 200. In this embodiment, the disk changing system 130 includes a pick 135 on which the disk 105 is secured. The disk sputtering system 100 commands the disk changing system to move and position disk 105 in the X, Y and Z axes to secure disk 105 within the grippers (which may also be referred to as pawls) 203 of panel 200 and then releases pick 135 from the disk. Although three grippers are illustrated in FIG. 2B, more or less grippers may be used.

At various times during the operation of disk sputtering system 100, teaching of the disk changing system 130 may be required to ensure that the disk changing system 130 is situating disks in proper alignment within the carrier panel 200, so that disks do not drop out of the panel during transportation along conveyor 120. Such teaching may occur, for example, when the disk sputtering system 100 is first started, when the damper pick 135 requires changing during cleaning maintenance on system 100, etc. Such activities require calibration, or re-calibration, of the disk changing system 130 to ensure that the disk changing system 130 inserts disks into the carrier panel in proper alignment.

Teaching is performed such that the disk sputtering system 100 memorizes the disk changing system 130 insertion positions of the disk 105 into panel 200. A software program stored within the disk sputtering system 100 is provided with the variable coordinates corresponding to the position of a disk when properly aligned within carrier panel 200 (referred to as a teaching point) of the disk changing system 130 through the teaching operation. A master teaching jig in the form of carrier panel 200 is used in the teaching operation. An objective of a master teaching jig is to ensure that the disk transportation system 100 has a good teaching point over multiple sets of carriers in order to help reduce the dropping of disks while the system 100 is in a production mode. The use of optical sensors in the teaching jig as discussed in detail below may allow for placement of, for example, 65 millimeter (mm) diameter by 0.635 mm thick disks in production carrier panels to be established with a precision of +/−0.1 mm. Such dimensions and values are only provided for exemplary purpose and embodiments of the present invention are not meant to be limited thereto.

Figure 3A:
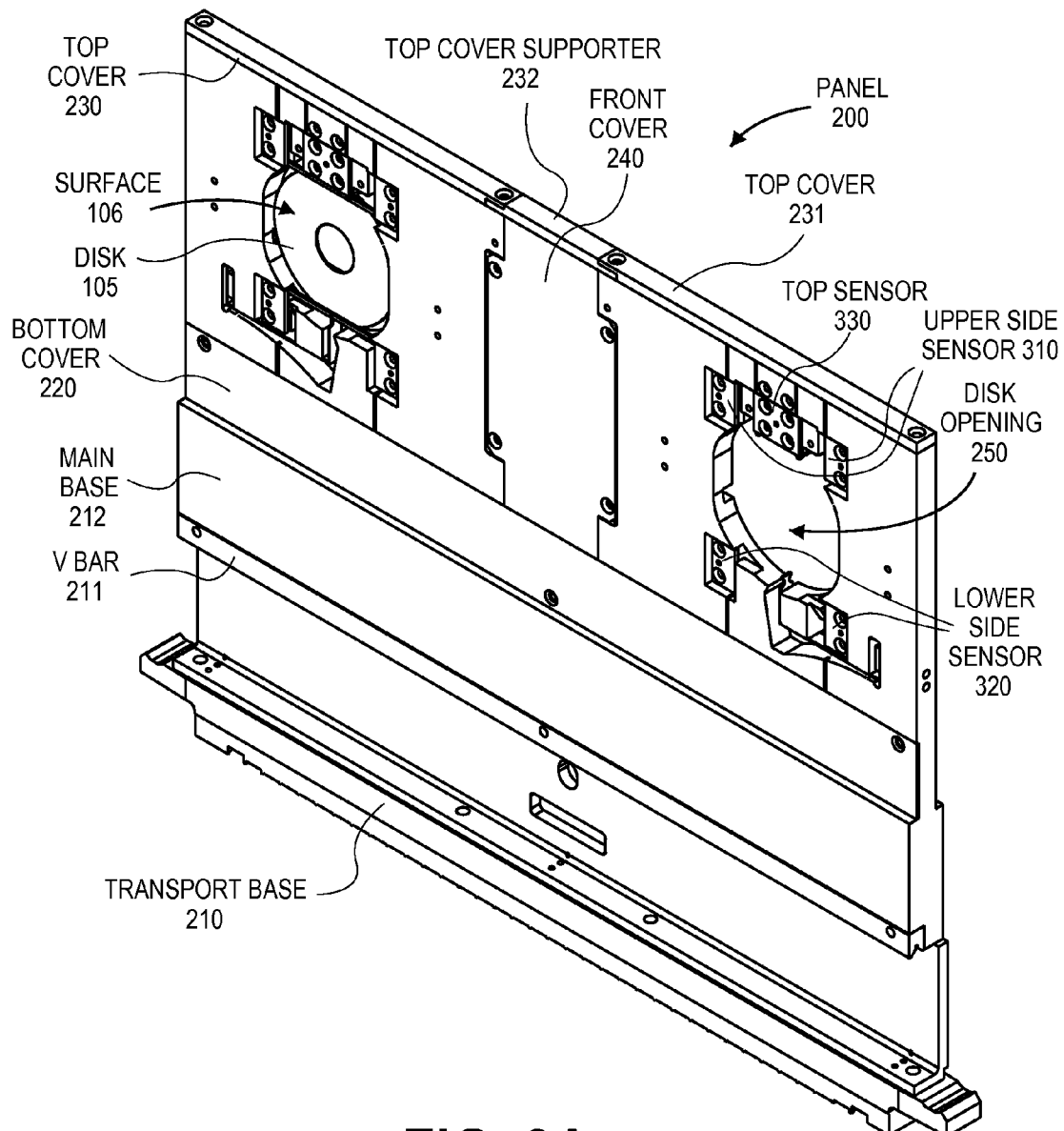
FIG. 3A is a perspective side view illustrates a front side of a carrier panel according to one embodiment of the present invention.

FIG. 3A is a perspective side view illustrates a front side of a carrier panel according to one embodiment of the present invention. Carrier panel 200 may be used as a master teaching jig for a teaching operation. For ease of understanding, the components of carrier panel 200 can be thought of in three sections: transportation, sensor and cover. The transportation section includes components such as the V-bar 211 and transport base 210 that allows the carrier panel to be secured on the conveyer 120 for movement within the system 100. The v-bar 211 makes contact with transportation rollers within chambers of the disk sputter system 100. The main base 212 is coupled on top of the magnetic base 210. The carrier panel 200 may also include one or more covers to protect wiring, contained in recessed/cavity areas of the panel, for example, bottom cover 220, top covers 230 and 231, and a front cover 240, and as discussed in further detail below. In this embodiment, two separate covers 230 and 231 are used with a top cover supporter 232 coupled there between. Alternatively, a single top cover may be used.

In this embodiment, carrier panel 200 includes two disk openings configured to receive disks to be secured therein by grippers 203 illustrated in FIG. 2B. Alternatively, carrier panel 200 may be configured with more or less than two disk openings with corresponding grippers and optical beam sensors as discussed below.

Figure 3B:
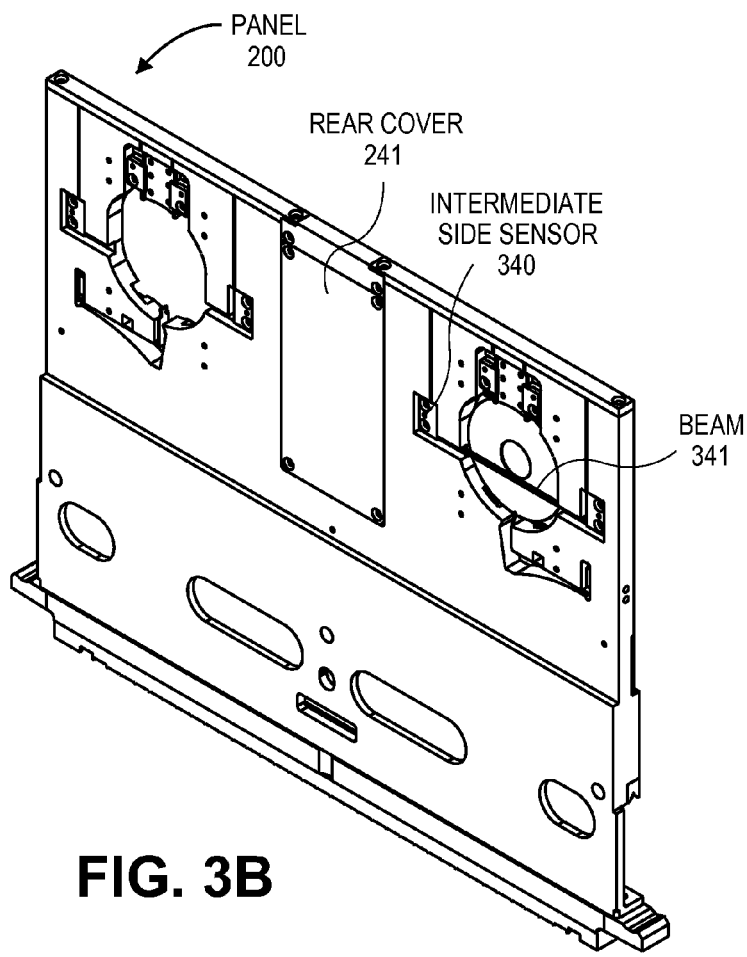
FIG. 3B is a perspective side view illustrates a back side of a carrier panel according to one embodiment of the present invention.

A disk 105 is illustrated in FIG. 3A within one of the disk openings of the panel 200 while the other disk opening 250 is shown without a disk therein. Each of the disk openings has a plurality of beam sensors disposed around it to project beams parallel to a surface (e.g., surface 106) of a disk when secured within the disk opening. In one embodiment, carrier panel 200 has an upper side sensor 310, a lower side sensor 320, top position sensors 330, and an intermediate side sensor 340 (not visible in the front side view of FIG. 3A). Intermediate side sensor 340 is disposed on the opposite, rear side of the panel 200, along with rear cover 241, as illustrated in the back, rear side view of FIG. 3B. Intermediate side sensor 340, when activated, projects an optical beam 341 across the disk opening adjacent a center area of the disk opening. The intermediate side sensor 340 may be used to determine a slant misalignment of a disk 105 inserted into the disk opening by detecting an interruption of beam 341. It should be noted that the intermediate side sensor 340 may be used independently or in conjunction with one or both of the upper and lower side sensors to determine a misalignment of disk 105 as discussed in further detail below.

Figure 3C:
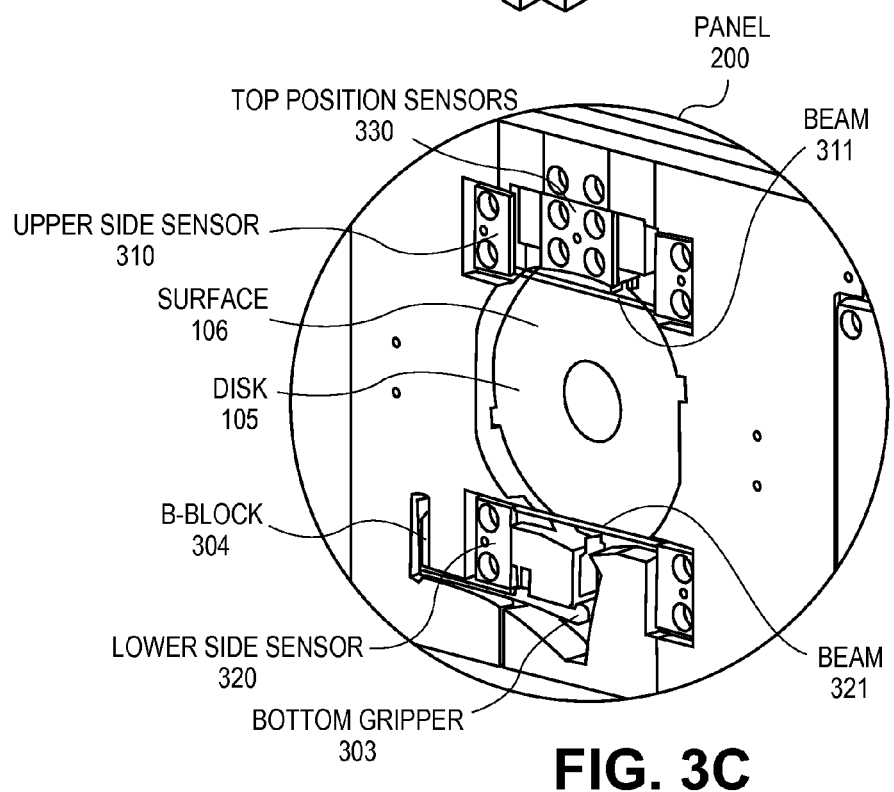
FIG. 3C is a more detailed view illustrating a portion of a carrier panel containing optical beam sensors according to one embodiment of the present invention.

FIG. 3C is a more detailed view illustrating a zoomed in portion of the carrier panel of FIG. 3A. Disk 105 is shown secured in one of the disk openings using bottom gripper 303. A B-block 304, coupled to the bottom gripper 303, is used to provide an upward spring force to the gripper 303. In alternative embodiments, additional grippers may be used to secure disk 105 within the disk opening of the panel. As can be more clearly seen in FIG. 3C, lower side sensor 320 is disposed on the front side (i.e., the side of the panel facing the disk changing system 130 as illustrated by FIGS. 2A and 2B) by a lower area of disk 105 and, when activated, projects an optical beam 321 across the disk opening by a lower area of the disk opening. Upper side sensor 310 is also disposed on the front side of panel 200 by an upper area of disk 105 and, when activated, projects an optical beam 311 across the disk opening by an upper area of the disk opening. In one exemplary embodiment, the placement of the upper side sensor 310 is approximately in a range of 26 mm to 27 mm from the top edge of the disk opening; the placement of the lower side sensor 320 is approximately in a range of 29 mm to 30 mm for the top edge of the disk opening, and; the placement of the intermediate side sensor 340 is approximately in a range of 10 mm to 11 mm for the bottom edge of the disk opening. The top positions sensors 330 are used to encounter the disk 105 in a vertical direction (e.g., along the z axis of FIG. 2A). In one embodiment, the beam sensors are FU-18M Keyence fiber optic sensors. Alternatively, other beam sensors may be used. The operation of the sensors is discussed in further detail below in regards to FIGS. 4-6.

FIG. 4A is a cross sectional view conceptually illustrating the operation of the side beam sensors, according to one embodiment of the present invention. Disk 105 is shown secured in the disk opening of panel 200, by bottom gripper 303 and top gripper 304, after insertion 419 by disk changing system 130. As can be seen from the conceptual illustration of FIG. 4A, the position of the side sensors creates an "OK" zone 410 for insertion of the disk 105. In one embodiment, the upper and lower side sensors on the front side (i.e., facing the direction of insertion 419) may be used to detect the extraction distance of the disk changing system 130 and the slant misalignment of the disk 105 within the disk opening when secured by the grippers. In one embodiment, the intermediate side sensor may be used to determine that the disk changing system 130 does not over insert during teaching and to detect the existence of a slant misalignment of the disk 105 within the disk opening when secured by the grippers. The existence of a slant misalignment may be detected using the upper, lower and intermediate sensors by projecting respective beams across the surface of the disk 105 and detecting whether one or more of the beams are interrupted by the presence of the disk.

Figure 4B:
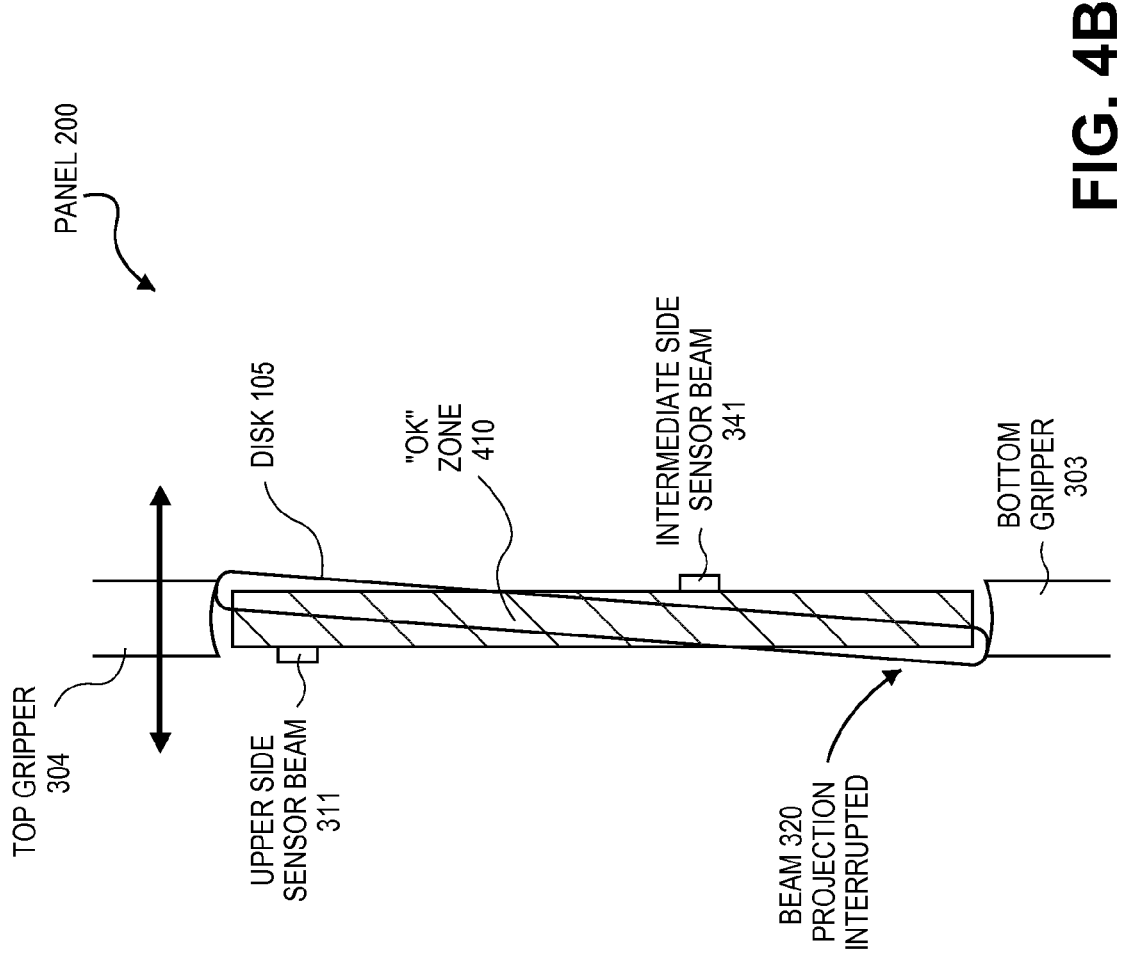
FIG. 4B is a cross sectional view conceptually illustrating the operation of the side beam sensors when a disk is misaligned, according to one embodiment of the present invention.

During teaching, the various beam sensors are connected, through wiring, to a programmable controller (controller 690 shown in FIG. 6) of the disk sputter system 100 through amplifier 660. The interruption of a beam causes a triggering of a corresponding sensor to send a signal to the programmable controller 690. If the disk is in proper alignment within OK zone 410 as shown in FIG. 4A, then the disk will not interrupt any of the beam projections and the beam sensors do not trigger a signal to the programmable controller 690. However, if one or more of the beam sensors triggers a signal indicating that a corresponding beam projection is interrupted as illustrated by the beam 320 projection interruption of FIG. 4B, then such a condition results in a determination that the disk 105 has a slant misalignment or is outside the OK zone (e.g., due to under or over insertion) in that particular position that the disk was placed in by the disk changing system 130. When a misalignment condition exits, then the disk changing system 130 repositions disk 105 and the programmable controller 690 rechecks whether any of the beam sensors still trigger a signal indicating an interrupt any of the beam projections. Re-teaching of the disk changing system 130 by a technician may be done until the programmable controller 690 does not sense a trigger of a sensor.

FIG. 5A is a cross sectional view conceptually illustrating the operation of top beam sensors, according to one embodiment of the present invention. In this embodiment, the top position sensors 330 include a left side top sensor 540 and a right side top sensor 530 (i.e., with respect to a frontal view relative to the disk changing system as in FIG. 2B) to detect a vertical misalignment of disk 105 within the disk opening, as secured by the grippers, by the disk changing system 130. The right side top sensor 530 and a left side top sensor 540 are coupled to a top pocket 550 of the panel 200 with sensor brackets 539 and 549. The top pocket 550 also includes a top gripper to help secure disk 105. The right side top position sensor 530 projects a beam 531 towards the front surface of disk 105 and the left side top sensor 540 projects a beam 541 towards the rear surface of disk 105. As can be seen in the frontal view of FIG. 5B, the left side top sensor 540 and right side top sensor 530 are not placed exactly opposite each other but, rather, are spaced apart a distance D. In one exemplary embodiment, the distance D is approximately 20 mm. Alternatively, other spacing distances may be used.

The right side top sensor 530 and the left side top sensor 540 provide a signal to the programmable controller of the disk sputtering system 100 when a disk is detected to be in proper vertical alignment. When no signal is detected by the programmable controller 690, such a condition indicates that the disk is vertically misaligned.

Figure 6:
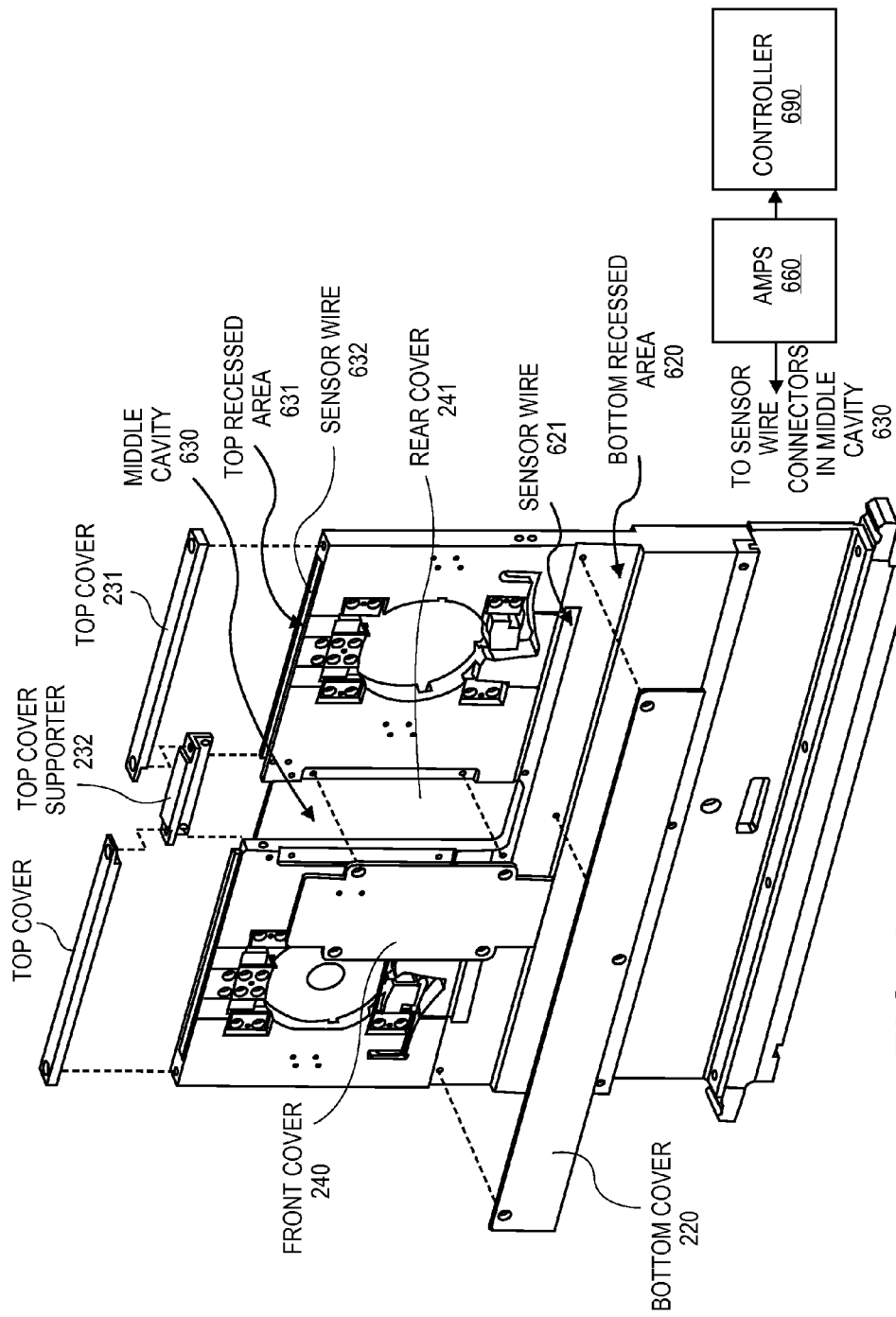
FIG. 6 is an exploded view illustrating cover and wiring components of the carrier panel, according to one embodiment of the present invention.

FIG. 6 is an exploded view illustrating cover and wiring components of the carrier panel, according to one embodiment of the present invention. Carrier panel 200 may also include one or more covers to protect wiring, contained in recessed areas of the panel, that connects sensors to electronic components as discussed in more detail below. The use of covers may also assist in prevent wire entanglement with other components of the disk sputter system 100 during the transportation of the panel to other chambers.

The panel 200 includes recessed areas underneath the covers (e.g., top recessed area 631 underneath top cover 231) forming cavities in the panel in order to contain the wiring that is coupled to the beam sensors. In one embodiment, the sensor wires (e.g., sensor wire 631) of the top positions sensors (e.g., sensors 330) are contained within a respective top recessed area (e.g., recessed area 631) and the sensor wires (e.g., sensor wire 621) of the lower side sensors (e.g., sensor 320) are contained within a respective bottom recessed area 620 associated with a disk opening. The sensor wires from the beam sensor corresponding to each of the disk openings are routed to a middle cavity area 630 that, in one embodiment, is formed by the front cover 240 and the rear cover 241. The middle recessed area may contain sensor wiring connectors. When the carrier panel 200 is at a teaching position, one or more of the covers may be removed to allow an amplifier (AMP) 660 to be connected to the beam sensors wiring connectors.

As noted above, in one embodiment, the beam sensors are FU-18M Keyence fiber optic sensors The FU-18M is small in size (1.5 mm×2 mm×20 mm) and the smallest detectable object is +/−0.02 mm. In yet another embodiment, to optimize the sensitivity of the beam sensors, the amplifier may be coupled to the beam sensor wiring to transmit amplified triggering signals to the programmable controller 690 of the disk sputtering system 100. The amplifier may be a FS-V31 amplifier also available from Keyence. Alternatively, other types of amplifiers may be used.

Certain embodiments of the methods described above may be implemented as a computer implemented method that may include instructions stored on a computer-readable medium. The method may be performed by processing logic that may comprise hardware (e.g., circuitry, dedicated logic, programmable logic, microcode, etc.), software (e.g., instructions), firmware, or a combination thereof. These instructions may be used to program the controller 690 to perform the described operations. A machine-readable medium includes any mechanism for storing or transmitting information in a form readable by a computer. The computer-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. Additionally, some operations may be repeated within an iteration of a particular method.

In the foregoing specification, the present invention has been described with reference to specific exemplary embodiments thereof. It will, however, be evident that various modifications and changes may be made thereto without departing from the broader scope of the embodiments of the invention as set for in the appended claims. The specification and drawings are, accordingly, to be regarded in an illustrative rather than a restrictive sense.

What is claimed is:

1. A disk carrier positioning apparatus, comprising:
a panel having a disk opening configured to receive a disk;
a plurality of beam sensors disposed around the disk opening to project beams parallel to a surface of the disk when secured within the disk opening, the plurality of beam sensors comprising at least one beam sensor on each of a front side and rear side of the panel; and
a top gripper and a bottom gripper to secure the disk within the disk opening,
wherein the plurality of beam sensors are configured to detect alignment of the disk within the disk opening when secured by the to and bottom grippers.

2. The apparatus of claim 1, wherein the plurality of beam sensors comprises an upper side sensor, a lower side sensor, and a intermediate side sensor to detect a slant of the disk within the disk opening when secured by the top and bottom grippers.

3. The apparatus of claim 2, wherein
the upper side sensor is disposed on a first side of the carrier by an upper area of the disk opening,
the lower side sensor is disposed on the first side of the carrier by a lower area of the disk opening, and
the intermediate side sensor is disposed on a second side of the carrier, adjacent a center area of the disk opening.

4. The apparatus of claim 3, further comprising first and second top sensors to detect a vertical position of the disk within the disk opening when secured by the top and bottom grippers.

5. The apparatus of claim 4, wherein the first and second top sensors are disposed above the disk opening on opposite ends of the top gripper.

6. The apparatus of claim 5, wherein the plurality of beam sensors and the top sensors are fiber optic sensors.

7. The apparatus of claim 1, further comprising:
a plurality of covers, each coupled to the panel and forming respective cavities therewith; and
wiring coupled to the plurality of beam sensors and disposed within the cavities.

8. The apparatus of claim 7, wherein the plurality of covers comprise a top cover, a front side cover, a rear side cover and a bottom cover.

9. The apparatus of claim 8, wherein at least one of the front side cover and the rear side cover are removable to enable the wiring to be coupled to an amplifier.

10. The apparatus of claim 1, wherein the panel comprises one or more additional disk openings configured to receive a corresponding one or more additional disks, each of the one or more additional openings have a corresponding additional plurality of beam sensors disposed there around to project beams parallel to a surface of the one or more additional disks, each of the additional plurality of beam sensors comprising at least one additional beam sensor on each side of the panel.

11. A method of teaching disk positioning, comprising:
inserting a disk into a disk opening of a carrier using a robotic arm; and
determining a misalignment of the inserted disk within the carrier using a plurality of beam sensors disposed around the disk opening, wherein the plurality of beam sensors comprise at least one beam sensor on each side of the disk,
wherein determining the misalignment comprises determining a slant misalignment of the disk within the disk opening by projecting a plurality of beams parallel to a surface of the disk using the plurality of beam sensors by detecting an interruption of at least one of the plurality of projected beams.

12. The method of claim 11, wherein determining the slant misalignment of the disk further comprises:
projecting a first beam of the plurality of beams by an upper side sensor;
projecting a second beam of the plurality of beams by a lower side sensor;
projecting a third beam of the plurality of beams by an intermediate side sensor; and
detecting the interruption of one or more of the first, second and third beams indicating a slant of the disk within the disk opening.

13. The method of claim 12, wherein determining the misalignment further comprises determining a vertical misalignment of the disk within the opening.

14. The method of claim 13, wherein determining the vertical misalignment of the disk comprises:
projecting a fourth beam towards an edge of the disk by a first top sensor;
projecting a fifth beam towards the edge of the disk by a second top sensor; and
detecting no signal from the first and second top sensors indicating that the disk is not in a proper vertical alignment.

15. A method of teaching disk positioning, comprising:
inserting a disk into a disk opening of a carrier using a robotic arm;
determining a misalignment of the inserted disk within the carrier using a plurality of beam sensors disposed around the disk opening, wherein the plurality of beam sensors comprise at least one beam sensor on each side of the disk,
inserting the disk into the disk opening of the carrier using the robotic arm; and
detecting at least one of an under insertion and an over insertion of the disk using the plurality of beam sensors.

16. A disk sputtering apparatus, comprising:
a disk transportation carrier comprising a panel having a plurality of disk openings, each of the disk openings have corresponding disk grippers to secure disk therein;
a disk changing system; and
a controller operatively coupled with the disk changing system to insert disks into and extract disks from the grippers within the disk openings of the panel, wherein the panel further comprises:
a plurality of beam sensors disposed around each of the disk openings to project beams parallel to a surface of the disk when secured within the disk openings, each of the plurality of beam sensors comprising at least one beam sensor on each side of the panel.

17. The disk sputtering apparatus of claim 16, further comprising an amplifier coupleable by wiring to the plurality of beam sensors.

18. The disk sputtering apparatus of claim 16, wherein the panel further comprises:
a top gripper and a bottom gripper to secure the disk within the disk opening, and wherein the plurality of beam sensors are configured to detect alignment of the disk within the disk opening when secured by the top and bottom grippers, and wherein the plurality of beams sensors comprises:
an upper side sensor, a lower side sensor and an intermediate side sensor to transmit corresponding triggering signals to the controller indicating an existence of a misalignment of the disk within the disk opening, and wherein the upper side sensor is disposed on a first side of the carrier, facing the disk damper picker, by an upper area of the disk opening, the lower side sensor is disposed on the first side of the carrier by a lower area of the disk opening, and the intermediate side sensor is disposed on a second side of the carrier, adjacent a center area of the disk opening.

* * * * *